(12) United States Patent
Yang (10) Patent No.: US 6,997,441 B2
(45) Date of Patent: Feb. 14, 2006

(54) VALVE STRUCTURE SUPPLYING LARGE VOLUME OF WATER

(76) Inventor: Shih-Sheng Yang, PO Box 82-144, Taipei (TW)

( * ) Notice: Subject to any disclaimer, the term of this patent is extended or adjusted under 35 U.S.C. 154(b) by 40 days.

(21) Appl. No.: 10/815,780

(22) Filed: Apr. 2, 2004

(65) Prior Publication Data

US 2005/0218165 A1  Oct. 6, 2005

(51) Int. Cl.
*F16K 51/00* (2006.01)

(52) U.S. Cl. ..................... 251/353; 251/284
(58) Field of Classification Search ............ 251/349, 251/353, 325, 284, 285
See application file for complete search history.

(56) References Cited

U.S. PATENT DOCUMENTS

| | | | | |
|---|---|---|---|---|
| 3,181,555 A | * | 5/1965 | Jacobson | 251/353 |
| 3,184,091 A | * | 5/1965 | Hoffman | 251/351 |
| 3,203,665 A | * | 8/1965 | Grant et al. | 251/353 |
| 4,314,689 A | * | 2/1982 | Wilson | 251/353 |
| 4,724,074 A | * | 2/1988 | Schaupp | 210/163 |
| 6,085,947 A | * | 7/2000 | Lien | 222/525 |

* cited by examiner

*Primary Examiner*—John Bastianelli
(74) *Attorney, Agent, or Firm*—Leong C. Lei (57) ABSTRACT

An outfall valve structure of great water volume comprises a base and a hollow pipe. The base is integrally formed with a coupler and a cylinder, while the interiors of the coupler and the cylinder are communicable with each other. In addition, the cylinder is provided with an opening at one end surface, and a plug on the interior of the other end surface. A locking ring is provided at an appropriate position on the interior sidewall of the cylinder. Thereby, the hollow pipe is adapted to the communicable coupler and cylinder, and forms a large-sized outlet to ease the user to drink the liquid contained in the water bag.

1 Claim, 7 Drawing Sheets

VALVE STRUCTURE SUPPLYING LARGE VOLUME OF WATER

BACKGROUND OF THE INVENTION (a) Technical Field of the Invention

The present invention relates to a valve structure supplying a large volume of water, particularly to one having an outlet of large proportions, which is provided with a compact valve able to extend to control the opening and closing of the outlet and can be made to form the end portion of a sports water bag such that the user can easily drink the liquid contained in the water bag.

(b) Description of the Prior Art

Water bags for sport purposes are commonly used nowadays. Taking the outfall valve for a sports water bag as disclosed in prior art U.S. Pat. No. 6,085,947 for example, said invention primarily comprises a bag for containing liquid. The bottom of the bag is connected with a water conduit, which is provided with a nozzle at the end. The bag can be carried on the user's back and can allow the user to drink the liquid any time from the nozzle through the connection and extension of the water conduit.

The water outlet and stop structure with a soft nozzle as disclosed in the above prior art can allow displacement of the opposite position of the positioning base and the sliding sleeve, such that the water can be released or stopped. While the water is released from the outlet groove at the edge of the post, the existence of the post in the center of the outlet groove renders the water volume rather small. Therefore, the user must forcibly suck water from the outlet crevice. Accordingly, the structure in the above-mentioned prior art cannot conform to the requirement of extracting a large volume of water.

In the outfall valve structure of said invention, as the inlet end and the outlet end are in alignment, the outfall valve provided between the water conduit of the water bag and the nozzle is not conformed to ergonomics requirement, since the outfall directs from the user's back toward front, the user must bend the water conduit back to close to his/her mouth for drinking.

As the valve used in the sports water bags of the prior art is in a liner form, the water conduit and the nozzle are combined in alignment. While the water bag is cried on the user's back, the user can bite the nozzle and drink the water from the water bag through the water conduit, which is flexible and bendable. In addition, the outlet crevice of the nozzle is usually in an upstanding line. When the user's mouth bites on it, the outlet crevice will open toward left and right, thereby the liquid contained in the water bag can be released for drinking by the user. However, since when the nozzle is combined with the water conduit, the direction of the outlet crevice can be steady, it is necessary to switch the nozzle to make the outlet crevice become upstanding such that the water can be released when the user's mouth bites on it.

Although the water conduit is flexible and can be freely bent, and the nozzle can be switched to allow the user to drink water, there must be certain limitations regarding the flexibility of the water conduit, as excessive bending of the water conduit will affect the flow rate of the liquid to become less, rendering the user unable to freely drink the liquid from the water bag. Meanwhile, in order to keep the outlet crevice of the nozzle vertical, there must be a corresponding force generated on the user's mouth since he/she must bite the nozzle with more force. This is the primary disadvantage of the prior art.

In view of the above disadvantage existing in the prior art, the inventor researched and invented an outfall valve conforming to ergonomics, which does not require bending the water conduit or switching the nozzle at the time of use.

SUMMARY OF THE INVENTION

The primary object of the invention is to provide a valve structure conforming to ergonomics, which does not require bending the water conduit, nor switching the nozzle using force in order to use it. The user can easily drink the liquid from the water bag.

The secondary object of the invention is to provide a valve structure supplying a large volume of water, which can allow the hollow pipe to be adapted to the communicable coupler and cylinder and form a large-size outlet, such that the user can easily drink the liquid contained in the water bag.

Yet a further object of the invention is to provide a valve structure conforming to ergonomics, in which the combined nozzle and water conduit can be rotated in a 360-degree angle, thereby enabling the outlet crevice to be easily adjusted to a vertical position.

To achieve the above objects, the invention discloses a valve structure supplying a large volume of water, which comprises a base and a hollow pipe which is moveably provided in the base. The base is composed of the communicable coupler and cylinder; and a specific angle is formed between the coupler and cylinder. Therefore, when the hollow pipe is combined at the base, there will be an angle between the water inlet and the water outlet. In addition, the cylinder is provided with an opening at one end surface, and a plug on the interior of the other end surface. And a locking ring is provided at an appropriate position on the interior sidewall of the cylinder, while one end of the hollow pipe is provided with an inclined flange for inter-locking with the locking ring. Thereby, the hollow pipe is adapted to the communicable coupler and cylinder, and forms a large-sized outlet to enable the user to drink the liquid contained in the water bag more easily.

Accordingly, provided that the outlet crevice of the nozzle is not vertical, the hollow pipe can be rotated to make the outlet crevice become vertical to enable a user to bite the nozzle for drinking water. And after the user finishes drinking, he/she can move back the hollow pipe to make the two openings depart from each other, thereby closing the flow path and avoid water leakage from the nozzle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
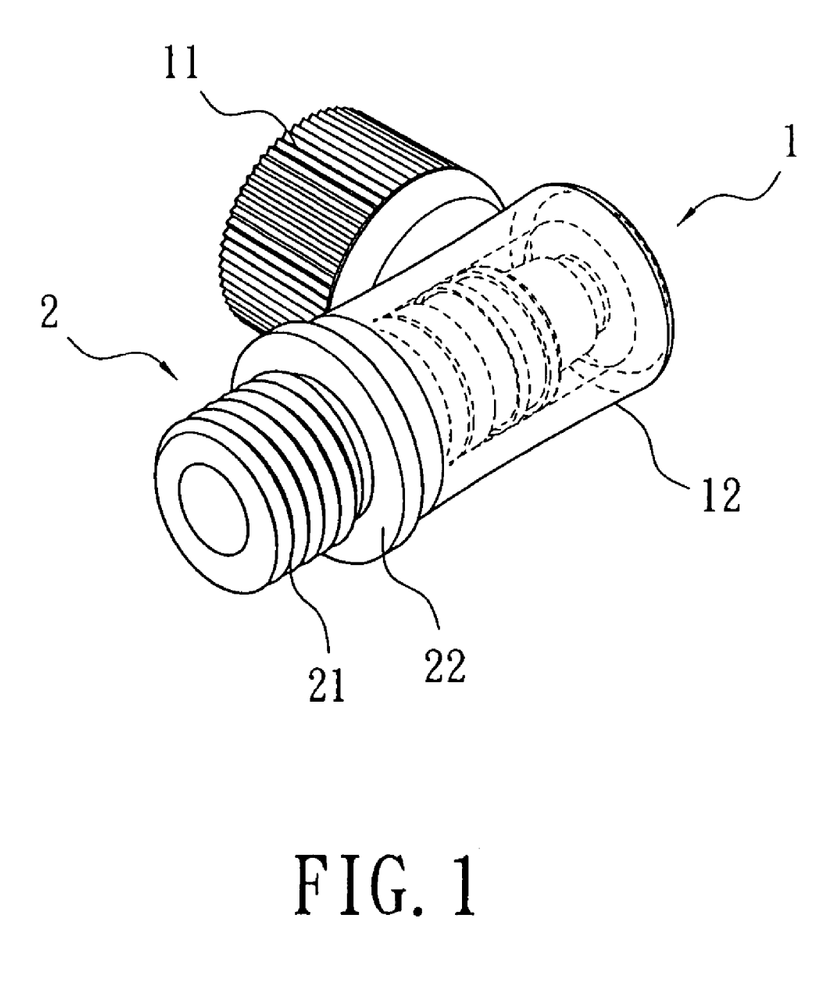
FIG. 1 is a perspective view of the present invention.
Figure 2:
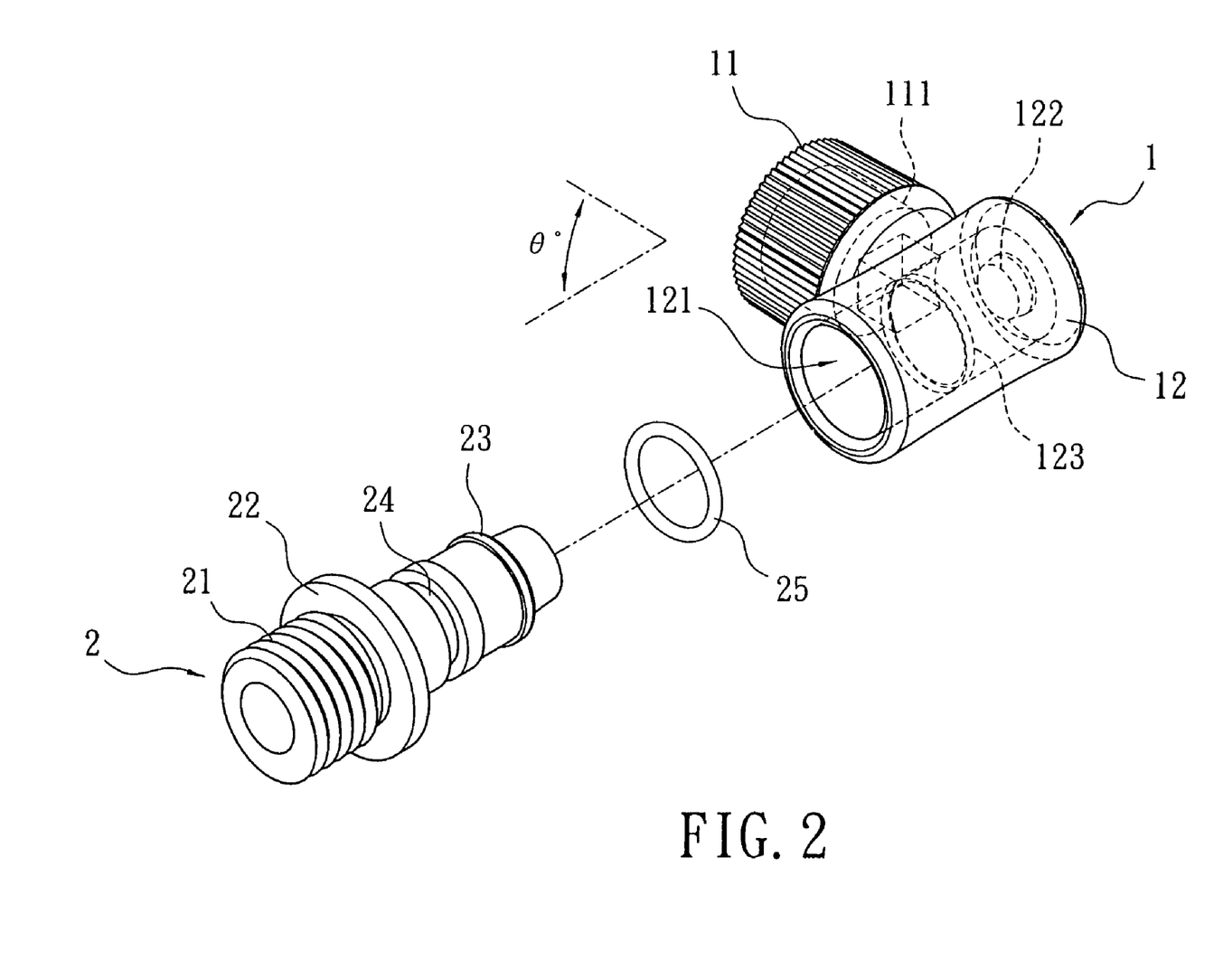
FIG. 2 is an exploded view of the present invention.

Referring to FIGS. 1 and 2, the invention discloses a valve structure supplying a large volume of water, which is composed of a base 1 and a hollow pipe 2 which can be assembled inside of the base 1 to form a valve for controlling the opening and closing status of the interior flow path, and easing the user to drink the liquid contained in the water bag.

The above-mentioned base 1 is composed of a coupler 11 and a cylinder 12. While the coupler 11 is integrally formed with the cylinder 12, which is provided with an opening 121 at one end surface. The other end of the cylinder 12 is a close end, and an extruding plug 122 is provided at the interior wall of the cylinder 12. And a locking ring 123 in is provided at an appropriate position on the interior sidewall of the cylinder 12.

A specific angle θ is formed between the coupler 12 of the base 1 and the cylinder 12 such that when the hollow pipe 2 is combined to the base 1, there will be a specific angle between the water inlet and the water outlet.

Figure 4:
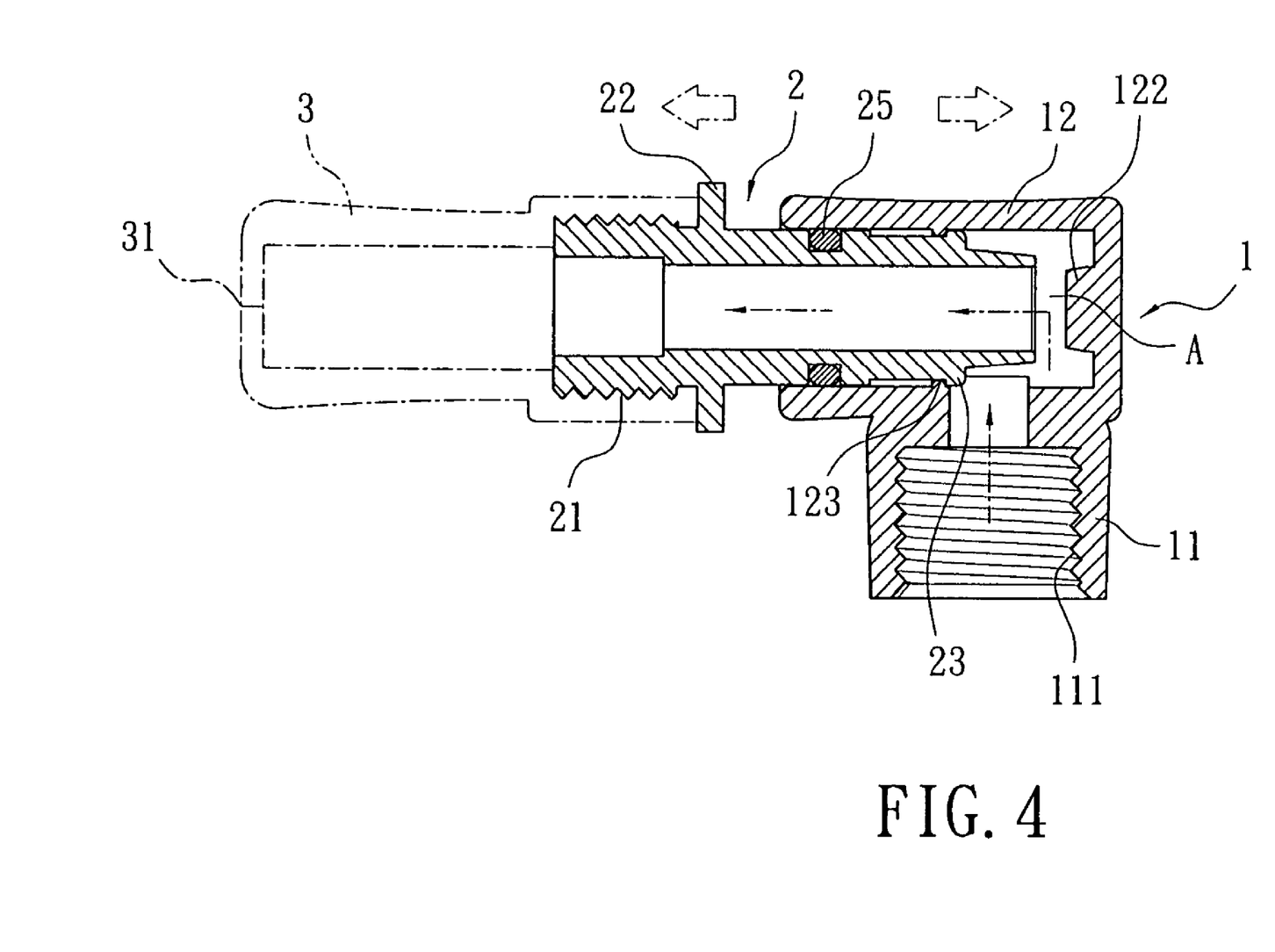
FIG. 4 is a side cut-away view showing the invention in water-releasing status.

The hollow pipe 2 is moveably provided in the base 1 through the opening 121 of the cylinder 12, while one end of the hollow pipe 2 is provided with exterior thread 21 for screwing to the nozzle 3. In addition, a rib ring 22 is further provided at an appropriate position on the hollow pipe 2, thereby the rib ring 22 can serve as a stopper for the nozzle 3 after assembly (as shown in FIG. 4). A flange 23 is provided at one end of the hollow pipe 2 for inter-locking with the locking ring 123. A groove 24 with an O-ring 25 inside is provided at an appropriate position on the hollow pipe 2 to prevent water from leaking out of the water bag 4. Thereby, a novel valve of great water volume has been accomplished.

When the hollow pipe 2 is inserted into the cylinder 12 of the base 1, a specific angle θ will be formed between the hollow pipe 2 and the coupler 11. As shown in the figures, there is a 90-degree angle in the embodiment of the invention. However, if the angle formed between the coupler 11 of the base 1 and the cylinder 12 is provided as an angle not of 90 degrees (for example, 60~135 degrees), after the hollow pipe 2 is inserted into the cylinder 12, the hollow pipe 2 will become a separator of said specific angle θ (for example, 60~135 degrees).

Figure 6:
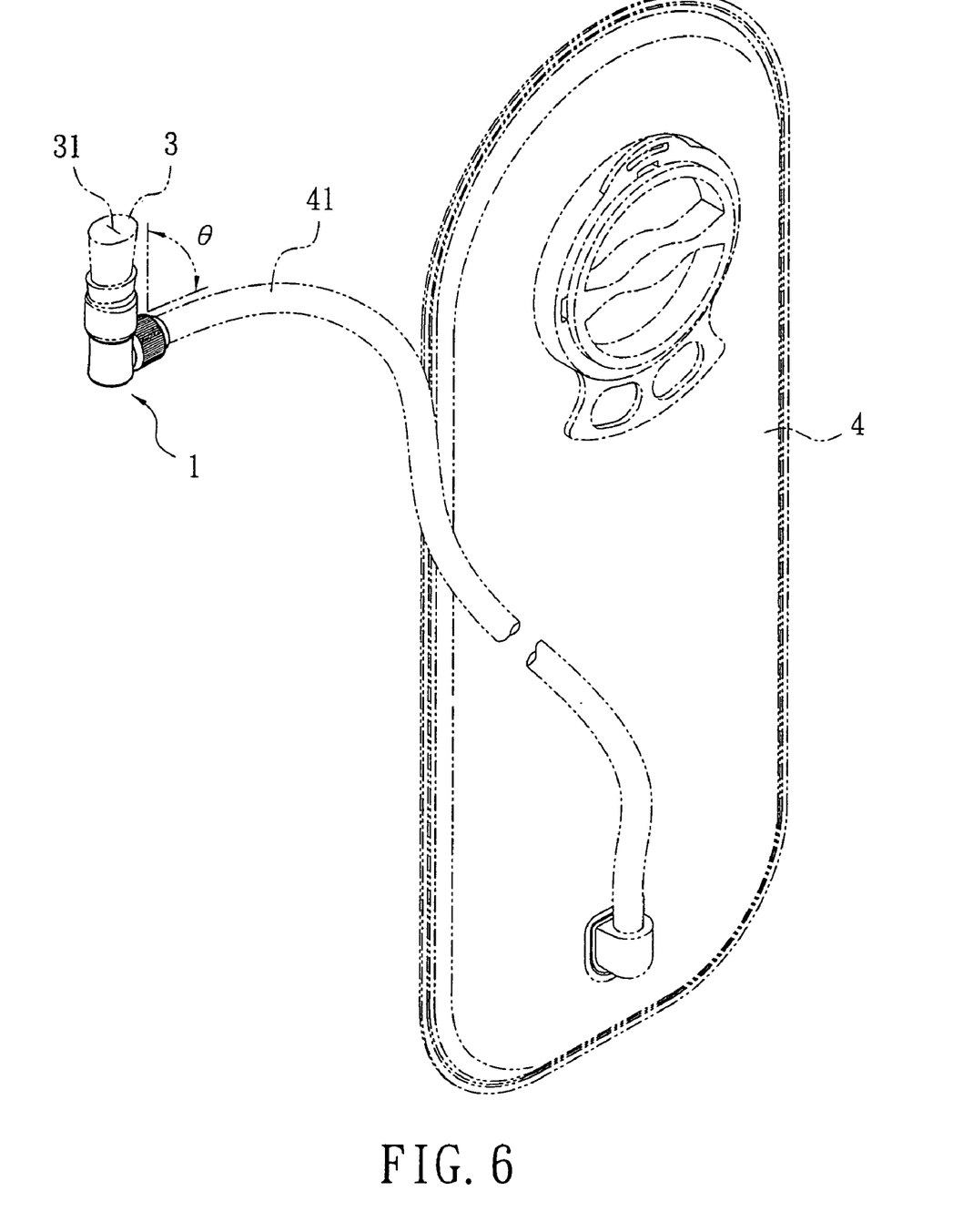
FIG. 6 is a reference view showing the use status of the invention.

Referring to FIGS. 4 and 6, in the valve according the invention can be screwed to the nozzle 3 via the exterior threads 21 of the hollow pipe 2. An outlet crevice 31 is provided at the front end of the nozzle 3 and can be combined to the water conduit 41 (as shown in FIG. 6) of the water bag 4 via the interior threads 111 of the coupler 11 of the base 1. Accordingly, an angle θ will be formed between the nozzle 3 and the water conduit 41 of the water bag 4 (It is set as 90 degrees in the embodiment shown in the figures.), such that the user can easily hold the water conduit 41 and bite the nozzle 3 at the right position without bending the water conduit 41 by force in order to bite the front end of the nozzle 3, as is using the structure of the prior art.

Figure 3:
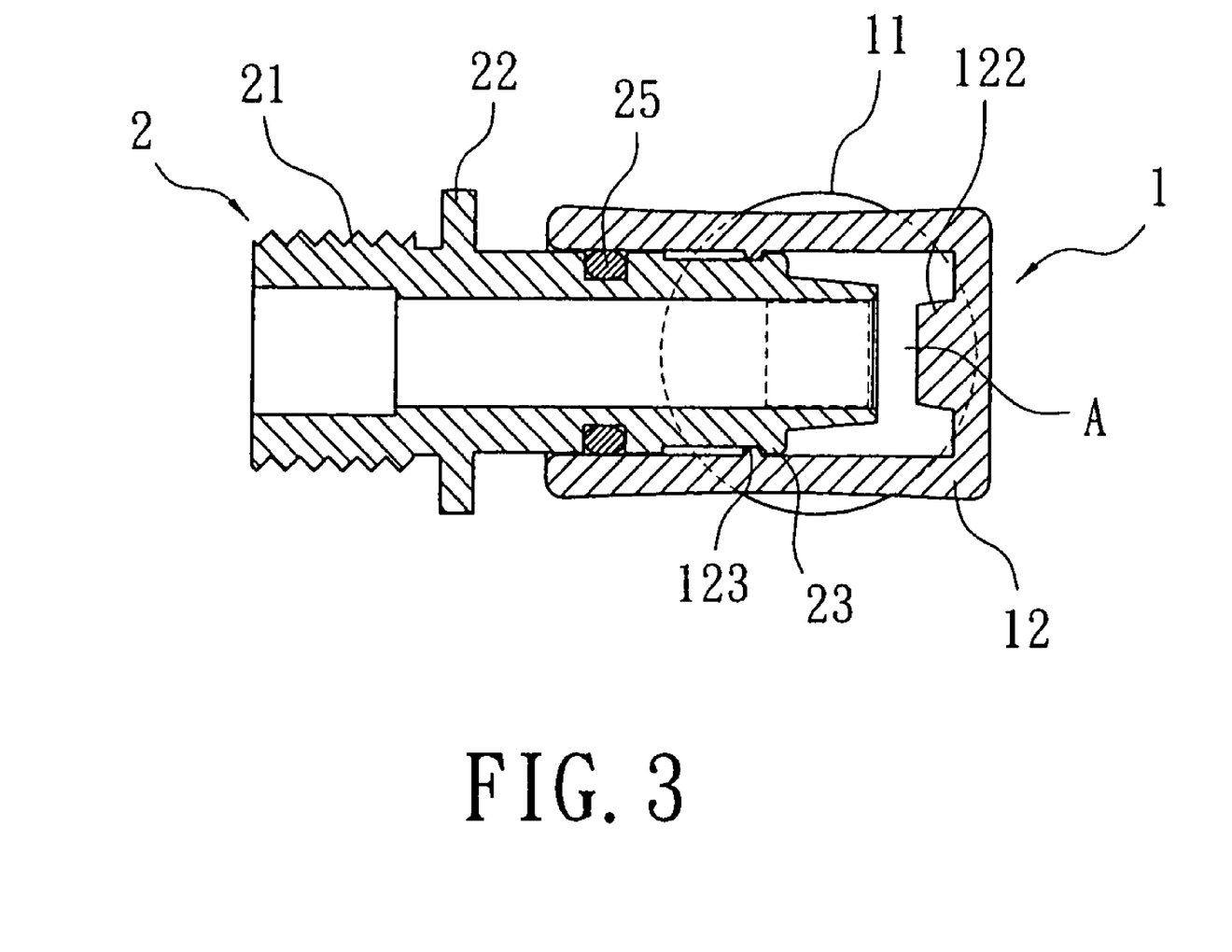
FIG. 3 is a top cut-away view showing the invention in water-releasing status.
Figure 5:
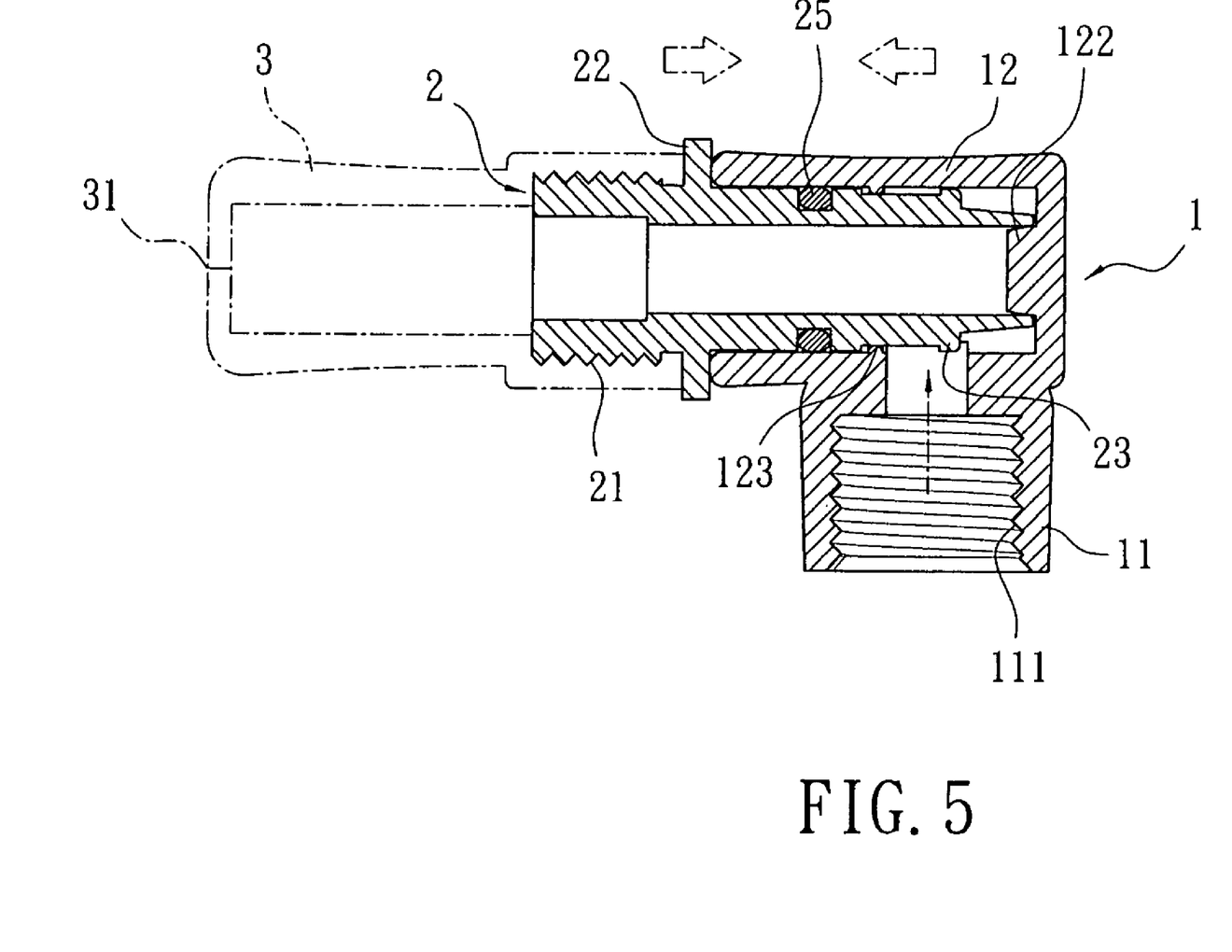
FIG. 5 is a side cut-away view showing the invention in water-stopped status.

Referring to FIGS. 3~5, when the user intends to drink the liquid in the water bag 4, he/she can pull the hollow pipe 2 toward the nozzle 3 to allow the flange 23 at one end of the hollow pipe 2 to lean against the locking ring 123 inside of the cylinder 12, thereby forming a stopping function to refrain the hollow pipe 2 from detaching. Meanwhile, the rear end of the hollow pipe 2 is removed away from the position where the plug 122, such that a space A would occur between the rear end of the hollow pipe 2 and the plug 122, and allow the liquid to flow through the communicable coupler 11 and the hollow pipe 2, and finally to the nozzle 3 for being consumed by the user. As the base 1 and the hollow pipe 2 are directly communicable, there is not any board or stopping element therebetween, the hollow pipe 2 can be adapted to the communicable coupler 11 and cylinder 12 and form an outlet of large-sized to ease the user to drink great volume of liquid from the water bag.

After finishing drinking the liquid, the user can push the nozzle 3 backward, such that the rear end of the hollow pipe 2 can be correspondingly mounted on the extrusion portion of the plug 122 to stop liquid from flowing.

The above descriptions have depicted the operation of the outfall valve according to the invention in terms of how to control the water to outflow and stop. A further function of the outfall valve according to the invention is that it can be rotated in a 360-degree angle. As the nozzle 3, outfall valve and the water conduit 41 are screwed together via threads, the out let crevice 31 of the nozzle 3 must not necessarily be vertical to make the user easily bite the nozzle 3.

Figure 7:
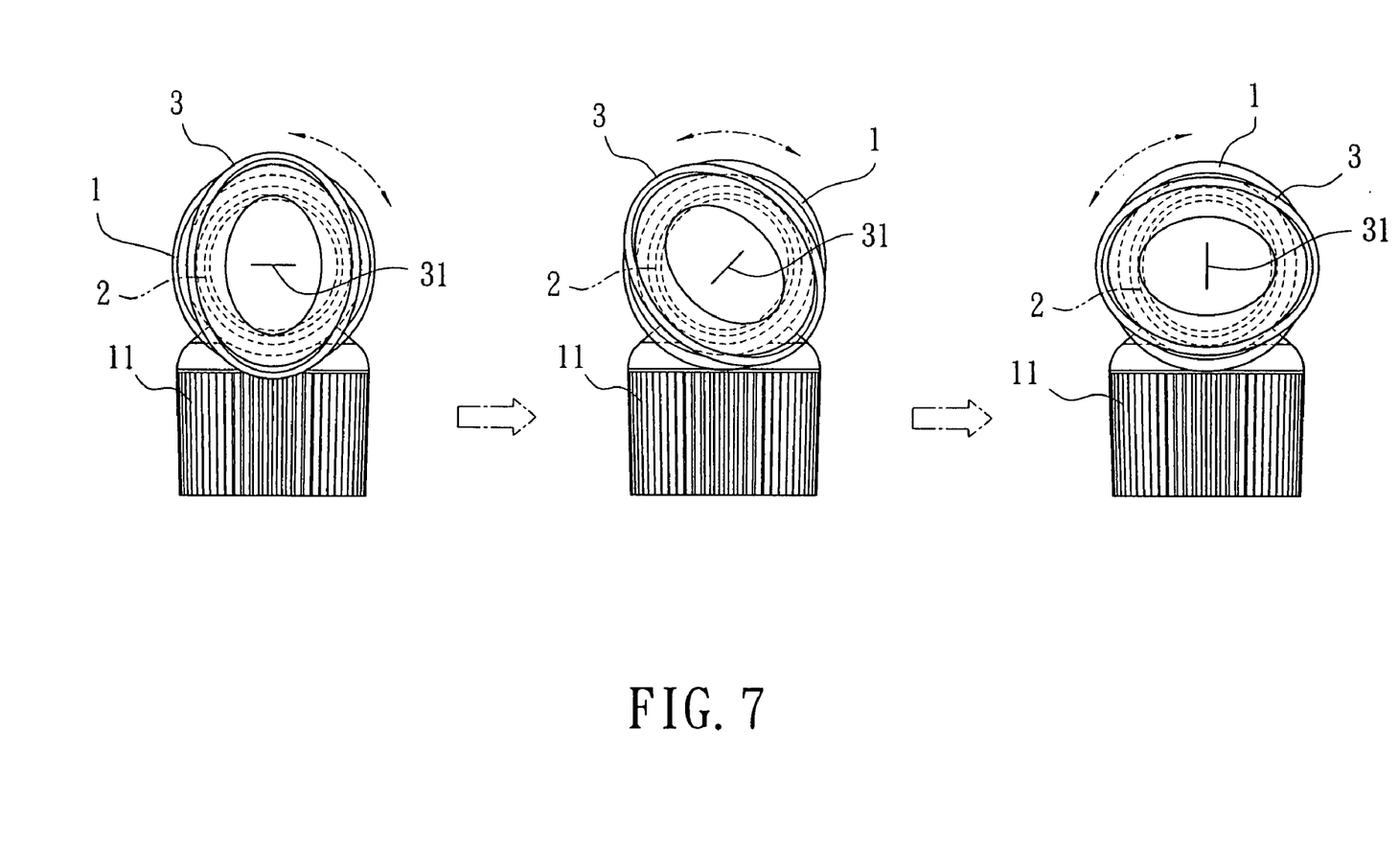
FIG. 7 schematically shows the rotation status when the nozzle is combined with the hollow pipe according to the invention.

Referring to FIGS. 6 and 7, the hollow pipe 2 combining with the nozzle 3 can freely rotate inside of the base 1, since the hollow pipe 2 is in the form of a circular pipe and is provided with an O-ring 25 on the groove 24 at the periphery, such that the inclined flange 23 provided at the rear end of the hollow pipe 2 can be locked with the locking ring 123 on the interior wall of the cylinder 12 of the base 1 without detaching. Under the circumstance that the user pulls the nozzle 3 close to his/her mouth, and that the outlet crevice 31 at the front end of the nozzle 3 does not preferably appear vertical, he/she can freely switch the nozzle 3 to make the combined hollow pipe 2 rotate along with the nozzle 2 inside of the cylinder 12. Meanwhile, the O-ring 25 will become leak-proof at the time of rotating. The outlet crevice 31 will then be adjusted to a vertical direction to ease the user to bite on the nozzle 3.

Accordingly, the structure according to the invention has the follow advantages:

1. The outfall valve according the invention can allow an angle formed between the nozzle and the water conduit. When in use, the user need simply pull the water conduit to the height of the mouth, he/she can reach the nozzle without bending the water conduit by force, as is with the products of the prior art.

2. The hollow pipe inserted into the casing can be freely rotated. Therefore, when the nozzle is connected to the outfall valve, if the outlet crevice doest not appear a right direction, the user can simply rotate the hollow pipe to adjust the outlet crevice of the nozzle to a prefer direction for biting.

3. By way of the combination of the outlet valve, the water conduit need not be bended for use, thereby the flow rate of the liquid contained in the water bag would not be affected, and user can drink the liquid easily.

Concluded above, the outfall valve structure supplying a large volume of water according to the invention can effectively improve the disadvantages existent in the prior art and can allow the base and the hollow pipe directly communicable without any barrier, in order to form an outlet of large-sized to ease the user to drink the liquid contained in the water bag. In addition, as there is an angle θ formed between the nozzle of the outfall valve and the water conduit of the water bag, the user can easily directly pull the water conduit to the height of his/her mouth and instantly bite the nozzle without bending the water conduit 41 by force in order to bite the front end of the nozzle, as is using the structure of the prior art. In view of the above, the invention discloses an innovated nozzle conforming to ergonomics, which is novel, highly improved, much more practical and applicable for use, as claimed by the inventor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A valve structure comprising:
    a base having a cylinder and a coupler integrally formed with said cylinder, said cylinder having an open end, a closed end, and an extruding plug provided at an inner side of said closed end, said coupler having interior threads;
    a locking ring mounted within said cylinder;
    a hollow pipe fitted in said open end of said cylinder and movably mounted in said cylinder, said hollow pipe having one end provided with exterior threads for screwing to a nozzle, said hollow pipe being provided with a rib ring which is served as a stopper for said nozzle, a flange being formed on sad hollow pipe for interlocking with said locking ring, a groove being formed between said rib ring and said flange to prevent water from leaking; and
    an O-ring fitted in said groove.

* * * * *